(12) United States Patent
Goto

(10) Patent No.: US 6,521,026 B1
(45) Date of Patent: Feb. 18, 2003

(54) REGENERATIVE TYPE CARBON DIOXIDE SEPARATOR AND CARBON DIOXIDE SEPARATING SYSTEM

(75) Inventor: Kazushige Goto, Kobe (JP)

(73) Assignee: Alstom K.K., Kobe (JP)

( * ) Notice: Subject to any disclaimer, the term of this patent is extended or adjusted under 35 U.S.C. 154(b) by 0 days.

(21) Appl. No.: 09/868,579

(22) PCT Filed: Oct. 20, 2000

(86) PCT No.: PCT/JP00/07349

§ 371 (c)(1),
(2), (4) Date: Jun. 20, 2001

(87) PCT Pub. No.: WO01/28661

PCT Pub. Date: Apr. 26, 2001

(30) Foreign Application Priority Data

Oct. 20, 1999 (JP) .......................... 11-298316

(51) Int. Cl.⁷ ........................ B01D 53/08; B01D 53/62
(52) U.S. Cl. ..................... 96/122; 96/125; 96/126; 96/146
(58) Field of Search ............. 95/113, 139; 96/122, 96/125, 126, 127, 128, 130, 143, 146; 423/230, 437.1

(56) References Cited

U.S. PATENT DOCUMENTS

| | | | | |
|---|---|---|---|---|
| 3,740,928 A | * | 6/1973 | Schmid | |
| 3,865,924 A | * | 2/1975 | Gidaspow et al. | ......... 422/223 |
| 4,472,178 A | * | 9/1984 | Kumar et al. | .................. 95/139 |
| 5,169,414 A | * | 12/1992 | Panzica et al. | |
| 5,520,894 A | * | 5/1996 | Heesink et al. | ............. 423/220 |
| 5,846,295 A | * | 12/1998 | Kalbassi et al. | ............... 95/105 |
| 5,866,090 A | * | 2/1999 | Nakagawa et al. | ......... 423/230 |
| 5,876,488 A | * | 3/1999 | Birbara et al. | .............. 422/178 |

FOREIGN PATENT DOCUMENTS

| | | |
|---|---|---|
| JP | 4086487 | 3/1992 |
| JP | 5-237342 | 9/1993 |
| JP | 6-91128 | 4/1994 |
| JP | 9-99214 | 4/1997 |
| JP | 10-249152 | 9/1998 |
| JP | 11-244655 | 9/1999 |
| JP | 11-262632 | 9/1999 |

\* cited by examiner

Primary Examiner—David A. Simmons
Assistant Examiner—Frank M. Lawrence
(74) Attorney, Agent, or Firm—Foley & Lardner

(57) ABSTRACT

A rotor includes a high-temperature section and a low-temperature section on its circumference. It is possible to absorb and separate carbon dioxide gas in an effluent or exhaust gas simply by rotating the rotor. Therefore, it is possible to obtain a reliable absorbing/separating system. The system can be remarkably simplified, the regenerating cost thereof can be considerably reduced, and the maintenance thereof is easy. A fixed type of system has similar advantages. Lithium zirconate, an alkali metal oxide, and/or an alkali earth metal oxide is used as an absorbing/separating agent. Such an absorbing/separating agent is chemically and mechanically stable, and can absorb and release carbon dioxide gas stably and reversibly.

10 Claims, 6 Drawing Sheets

REGENERATIVE TYPE CARBON DIOXIDE SEPARATOR AND CARBON DIOXIDE SEPARATING SYSTEM

This application is a 371 of PCT Application No. PCT/JP00/07349, filed on Oct. 20, 2000.

BACKGROUND OF THE INVENTION

1. Field of the Invention

The present invention relates to a regenerative carbon dioxide gas separator and a carbon gas separating system. More particularly, the present invention relates to a regenerative carbon dioxide gas separator and a carbon gas separating system that can separate carbon dioxide gas ($CO_2$) contained in effluent or exhaust gases from combustion boilers and the like in an efficient and economical manner.

2. Related Background Art

Carbon dioxide gas released into the atmosphere from various industrial facilities such as thermal power plants, refuse incinerating plants, etc., are said to be responsible for the global warming caused by the "greenhouse effect". Therefore, it is necessary to reduce the volume of carbon dioxide gas released into the atmosphere. For example, in a thermal power plant, a fuel such as a petroleum fuel, a coal fuel, LNG (liquid natural gas), etc. is burned in a boiler to generate a considerable volume of carbon dioxide gas.

Conventionally, as a method for separating carbon dioxide gas from an effluent or exhaust gas, a method using an "absorption liquid" containing an amine, and a "membrane separation method" using a cellulose acetate membrane or the like are proposed.

For example, Japanese Patent No. 2809368 discloses a method for recovering carbon dioxide gas by the use of an aqueous alkanolamine solution that in nonflammable. Further, Japanese Patent No. 2809381 discloses a separation system using a monoethanol amine absorption liquid, in which a heating source of a reboiler of an absorption liquid regeneration tower is optimized.

However, in such methods using "absorption liquid", absorption efficiency is not so high. For example, the volume of carbon dioxide collected by an absorption liquid containing an amine is at most about 20 to 30 times the volume of the absorption liquid. Therefore, in a large-scale combustion plant, an extremely large amount of absorption liquid should always be circulated.

Moreover, such methods using "absorption liquid" require an absorption tower for absorbing carbon dioxide gas, a regeneration tower for regenerating the absorption liquid, a reboiler, and a circulation system to connect these. Therefore, the system becomes very complicated.

Similarly, in a "membrane separation method", a pressure control mechanism is required so that only carbon dioxide gas is permeated from the positive pressure side to the negative pressure side of a separation membrane and absorbed. Therefore, the system becomes very complicated.

In addition, the allowable temperature that can be tolerated by the absorption liquids and separation membranes used in the above-described methods is about 200° C. Thus, heat resistance of such absorption liquids and separation membranes is low. Since the temperature of most effluent gases discharged from various combustion sources, such as a boiler of a thermal plant, is 600° C. or more, it is necessary to provide an effluent gas cooling system before introducing an effluent gas into a carbon dioxide gas separator. Therefore, the system becomes complicated, and the cost for separating carbon dioxide gas becomes high.

SUMMARY OF THE INVENTION

Given the above-described problems, the present invention is proposed. An object of the present invention is to provide a regenerative carbon dioxide gas separator and a carbon dioxide gas separating system that can separate carbon dioxide gas with great efficiency although they have far simpler configuration than conventional apparatuses or systems.

In order to achieve the above objective, a regenerative carbon dioxide gas separator according to the present invention includes: a rotatable rotor; an absorbing/separating agent housed in the rotor, for absorbing carbon dioxide gas at a temperature lower than a predetermined temperature, and for releasing the absorbed carbon dioxide gas at a temperature higher than the predetermined temperature; a first gas flow passage for passing a first gas through the rotor in a direction substantially parallel to a central axis of rotations of the rotor; a second gas flow passage for passing a second gas through the rotor in a direction substantially parallel to the central axis of rotations of the rotor; and a sealing mechanism for preventing the mixing of the first gas and the second gas, wherein carbon dioxide gas contained in the first gas is absorbed by the absorbing/separating agent and the carbon dioxide gas absorbed by the absorbing/separating agent is released into the second gas by rotating the rotor while the temperature of the first gas flow passage is set to be lower than the predetermined temperature and the temperature of the second gas flow passage is set to be higher than the predetermined temperature.

With the above-described structure, it is possible to obtain a carbon dioxide gas separator, which is more efficient, more cost-saving and more reliable than conventional devices.

The carbon dioxide gas separator may include a plurality of baskets attachable to the rotor, each having an opening in a direction of the gas flows. The absorbing/separating agent may be housed in the baskets.

Further, a regenerative carbon dioxide gas separator according to the present invention includes: a plurality of reaction chambers; an absorbing/separating agent housed in the plurality of reaction chambers, which absorbs carbon dioxide gas at a temperature lower than a predetermined temperature and releases the absorbed carbon dioxide gas at a temperature higher than the predetermined temperature; and switching means for selectively supplying one of first gas and second gas to the plurality of reaction chambers; wherein the regenerative carbon dioxide gas separator sequentially performs in the reaction chambers: absorption cycles in which the first gas is supplied to a reaction chamber to form a first gas flow passage while the temperature of the reaction chamber is maintained to be lower than the predetermined temperature, and the absorbing/separating agent absorbs carbon dioxide gas contained in the first gas; and regeneration cycles in which the second gas is supplied to the reaction chamber to form a second gas flow passage while the temperature of the reaction chamber is maintained to be higher than the predetermined temperature, and the absorbing/separating agent releases the absorbed carbon dioxide gas into the second gas.

With the above-described structure, a fixed-type regenerative carbon dioxide gas separator which is highly efficient and cost-saving can be obtained.

If the reaction chambers include heating means for heating the absorbing/separating agent to a temperature higher than the predetermined temperature, it is possible to heat the absorbing/separating agent to a temperature higher than the inflection point surely and easily.

If the absorbing/separating agent includes at least one of lithium zirconate, an alkali metal oxide, and an alkali earth metal, it is possible to realize highly efficient absorption/separation.

If the absorbing/separating agent is shaped into any of granular, porous, aggregated, tubular, deformed-plane, and linear shapes, or shaped into an aggregated or plane-structured article having through holes in a direction of the gas flows, it is possible to absorb/separate carbon dioxide gas in an efficient manner.

Moreover, if the absorbing/separating agent is supported on at least one of granular, porous, aggregated, tubular, deformed-plane, and linear molded article, or an aggregated or place-structured molded article having through holes in a direction of the gas flows, such an article is highly efficient and reliable.

If a plurality of absorbing/separating agents are provided, for each of which the determined temperature differs, it is possible to further improve absorbing/separating efficiency.

A carbon dioxide gas separating system according to the present invention includes: any of the above-described regenerative carbon dioxide gas separators; heating means for heating the second gas flow passage of the regenerative carbon dioxide gas separator to a temperature higher than the predetermined temperature; heat recovering means for cooling a gas flowing out of the first gas flow passage; and heat exchanging means for transferring heat energy from a gas containing carbon dioxide gas flowing out of the second gas flow passage to the first gas supplied to the first gas flow passage.

The carbon dioxide gas separating system may further include circulating means for supplying at least part of the gas containing carbon dioxide gas discharged from the second gas flow passage to the second gas flow passage again, and the heating means may be a regenerative burner or an indirect type of furnace for burning a fuel to heat the gas containing carbon dioxide gas circulated by the circulating means.

The heat recovering means may include a boiler for generating steam by the use of the gas discharged from the first gas flow passage, or may include the boiler, a steam turbine driven by the steam generated by the boiler, and a generator driven by the steam turbine.

The heat exchanging means may be a plate-type, tubular-type, or rotary-type of regenerative heat exchanger.

DESCRIPTION OF THE PREFERRED EMBODIMENTS

Hereafter, preferred embodiments of the present invention will be described with reference to the accompanying drawings.

Figure 1:
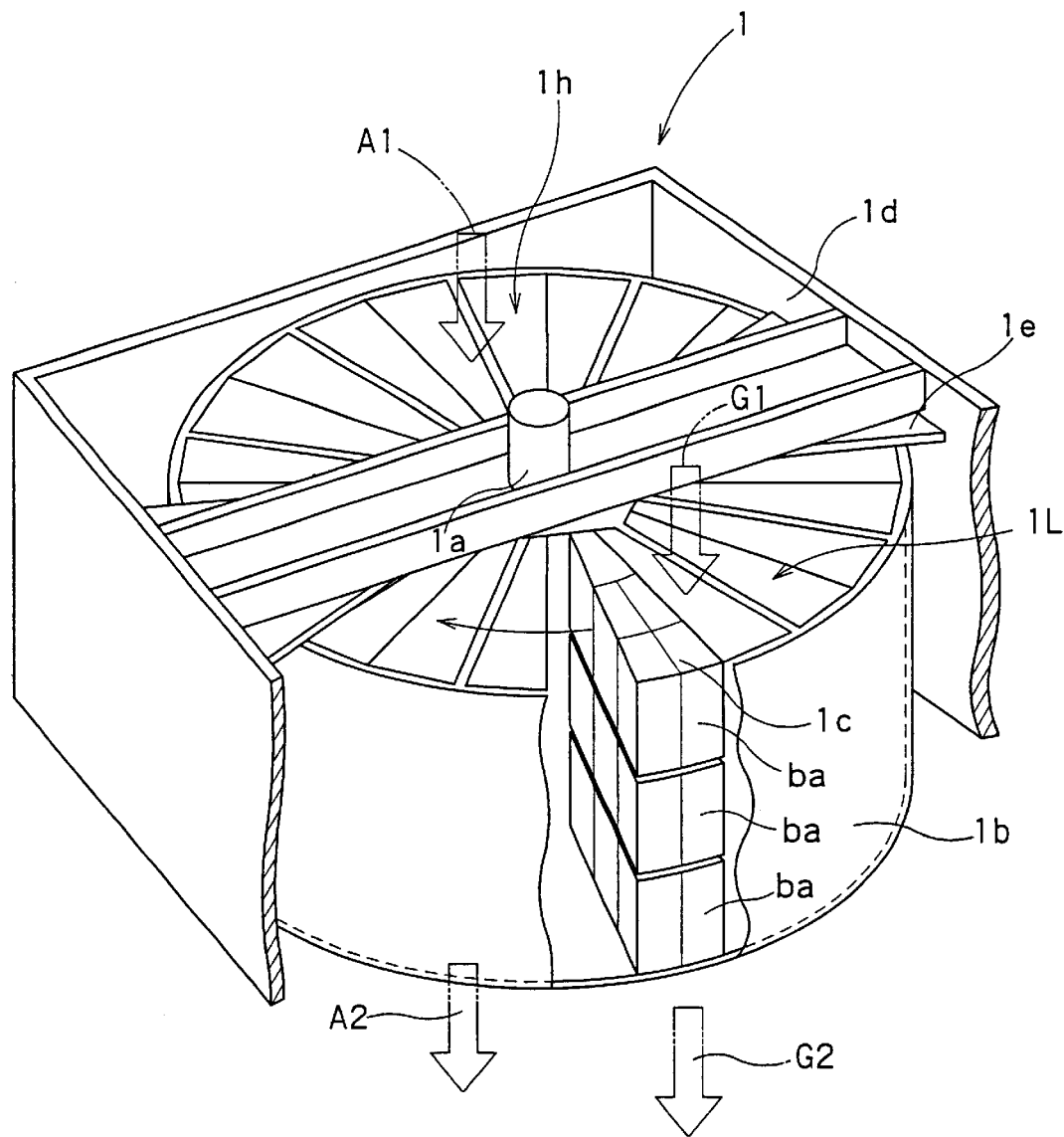
FIG. 1 is a perspective view of a rotating regenerative carbon dioxide gas separator according to the present invention.

FIG. 1 is a perspective view showing a regenerative carbon dioxide gas separator according to the present invention. A regenerative carbon dioxide gas separator 1 shown in FIG. 1 is of rotating type. The separator 1 includes a rotation shaft $1a$, a rotor $1b$ which rotates around the rotation shaft $1a$ at a predetermined speed in a direction shown by an arrow, and compartments (sometimes called "sectors") $1c$ housed in the rotor $1b$. Each compartment $1c$ is filled with an absorbing/separating agent, which reversibly absorbs or releases carbon dioxide gas in accordance with changes in temperature. Specifically, a compartment $1c$ may be provided with, e.g., a plurality of baskets ba, which are filled with the absorbing/separating agent. In this case, each basket ba has an opening in a direction of a gas flow to secure contact between the absorbing/separating agent and carbon dioxide gas. For this purpose, the opening of each basket ba may be formed like, e.g., a net or lattice.

As described later, a material having a characteristic to absorb carbon dioxide gas at a relatively low temperature, and to discharge the absorbed carbon dioxide at a relatively high temperature, is used as the absorbing/separating agent. In FIG. 1, the reference numerals $1d$ and $1e$ denote a rotor housing and a sector plate, respectively.

The separator 1 thus constituted has a high temperature section $1h$ and a low temperature section $1L$, which are provided as partitioned sections around the rotation shaft $1a$ of the rotor $1b$. An effluent or exhaust gas G1 discharged from a boiler, an incinerator, etc. (not shown) is supplied to the low temperature section $1L$. A carrier gas A1 for carrying carbon dioxide gas released from the absorbing/separating agent is supplied to the high temperature section $1h$.

While the effluent gas G1 is passing through the low temperature section $1L$, carbon dioxide gas contained in the effluent gas G1 is absorbed by the absorbing/separating agent filled in the compartment $1c$, and separated from the effluent gas G1. After the separation of carbon dioxide gas, the rest of effluent gas G1, i.e., an effluent gas G2, is removed from an outlet of the separator.

As the rotor $1b$ rotates, the compartment $1c$ moves to the high temperature section $1h$ and contacts the high-temperature carrier gas A1, resulting in that the carbon dioxide gas absorbed by the absorbing/separating agent is released from the absorbing/separating agent, and discharged as a gas flow A2 containing the carbon dioxide gas and the carrier gas. After the separation of the carbon dioxide gas, as the rotor $1b$ rotates, the absorbing/separating agent $1g$ moves to the low temperature section $1L$ again, and absorbs and separates carbon dioxide gas from the effluent gas G1 again.

The high temperature section $1h$ and the low temperature section $1L$ are sealed by a sealing system, not shown, to prevent leakage of gas. Therefore, the effluent gases G1 and G2, and the carrier gasses A1 and A2 are not mixed with each other.

In the embodiment shown in FIG. 1, the gas flow G1 and the gas flow A1 are parallel to each other, and move downwards. However, they may be parallel to each other and move in opposite directions. In this embodiment, assuming that an upper part of the rotor is a high temperature side, and a lower part of the rotor is a low temperature side, a heat-resistant stainless steel is used at the high temperature side, and a soft steel or steel for welding structure is used at the low temperature side, as materials of heat exchangers. The entire weight of the rotor is supported by a rotor bearing provided below the low temperature side.

Inside of the rotor is air-cooled structure, and outside thereof is heat-insulated structure against the heat of the rotor. A rotor bearing provided at the upper section allows the thermal expansion in a vertical direction, and supports the rotor only in a horizontal direction.

This rotating regenerative separator may be installed so that the rotor shaft extends in a horizontal direction.

According to the present invention, carbon dioxide gas contained in an effluent gas can be absorbed and separated by simply rotating the rotor $1b$ because of the high temperature section $1h$ and the low temperature section $1L$ provided on the circumference of the rotor $1b$. Therefore, it is possible to obtain an absorbing/separating system, which is highly simplified but reliable. The regeneration costs of such a system can be remarkably reduced, and the maintenance of such a system is easy.

Next, preferred absorbing/separating agents used in a regenerative carbon dioxide gas separator according to the present invention will be described. Lithium zirconate, an alkaline metal oxide, or an alkaline earth metal oxide can be used as the absorbing/separating agent. For example, Japanese Patent Laid-Open Pub. Nos. 99214/1997 and 152302/1998 disclose in detail such compounds.

As an absorbing/separating agent, lithium zirconate, i.e., an oxide of lituim (Li) and zirconium (Zr) can be used. Specifically, $Li_2ZrO_3$ and $Li_4ZrO_4$ can be used.

The following absorbing/releasing reactions occurs between $Li_2ZrO_3$ and carbon dioxide gas:

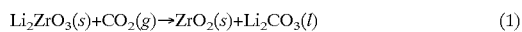

$$Li_2ZrO_3(s)+CO_2(g) \rightarrow ZrO_2(s)+Li_2CO_3(l) \qquad (1)$$

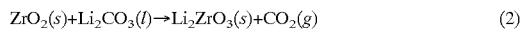

$$ZrO_2(s)+Li_2CO_3(l) \rightarrow Li_2ZrO_3(s)+CO_2(g) \qquad (2)$$

By the above absorbing reaction (1) and the above releasing reaction (2), it is possible to reversibly absorb and release carbon dioxide gas. The absorbing reaction (1) is remarkable in a temperature range of about 400° C. to about 580° C. The releasing reaction (2) is remarkable in a temperature range of about 600° C. or more. Therefore, if the absorbing/separating agent is placed in the low temperature section in a temperature range of about 400° C. to about 580° C., the absorbing/separating agent $1g$ actively absorbs carbon dioxide gas in the effluent gas. If the absorbing/separating agent is moved to the high temperature section in a temperature range of about 600° C. or more, the absorbed carbon dioxide is released.

Figure 2:
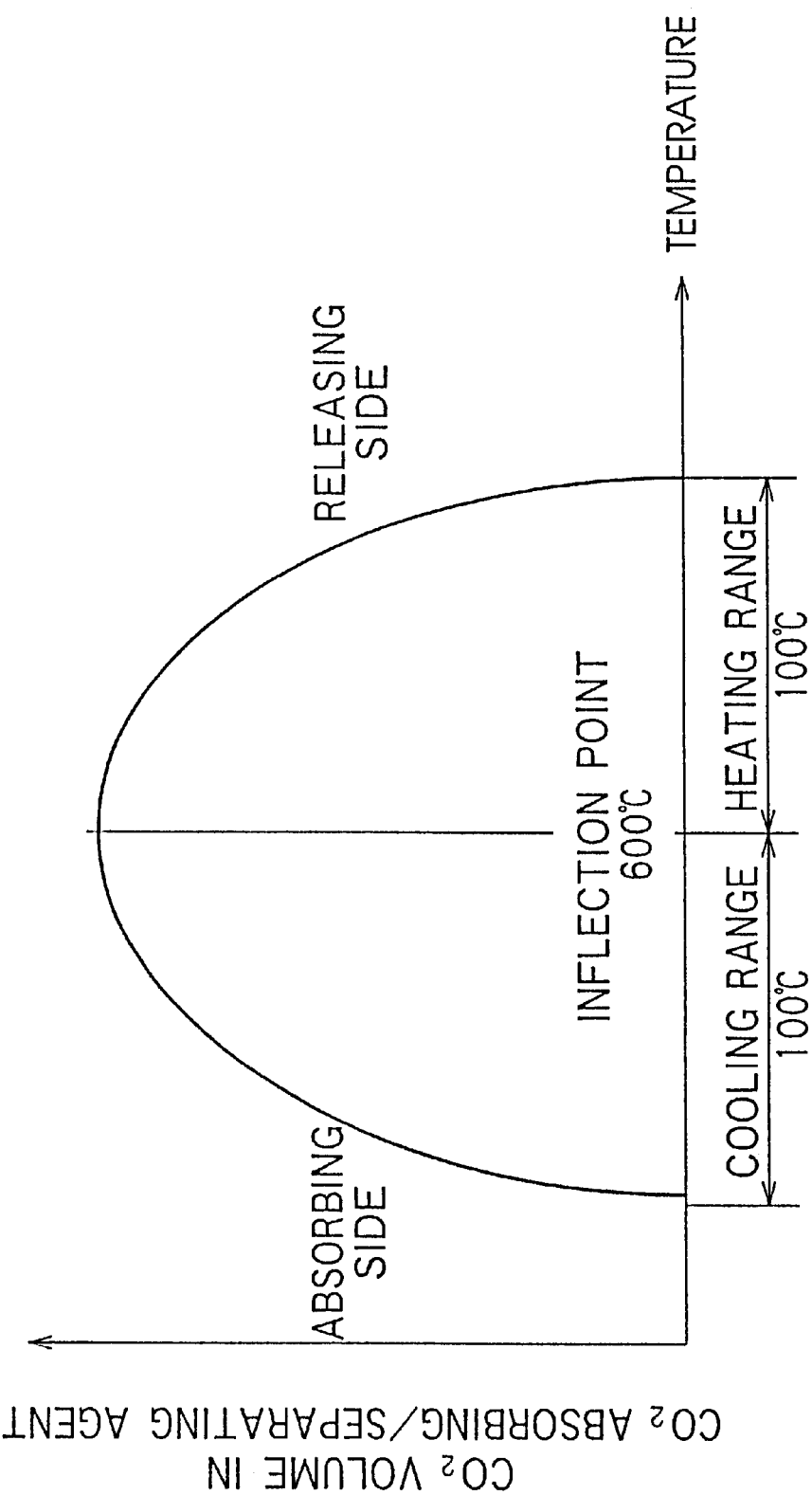
FIG. 2 is a graph showing a reaction model using $Li_2ZrO_3$ as an absorbing/separating agent.

FIG. 2 is a graph showing a reaction model using $Li_2ZrO_3$ as an absorbing/separating agent. The abscissa axis of the graph shows the temperature, and the ordinate axis shows the volume of carbon dioxide gas contained in the absorbing/separating agent.

Figure 3:
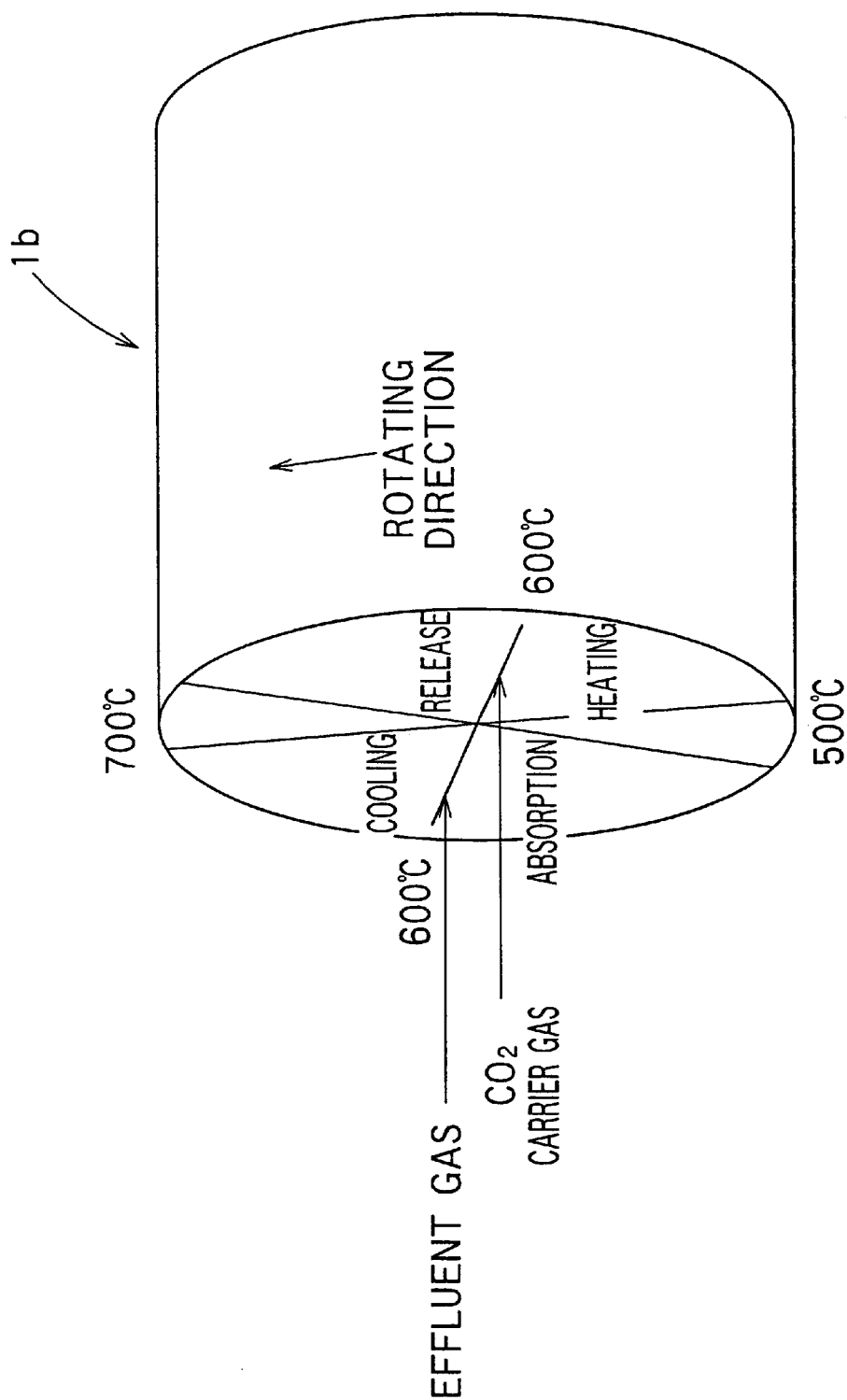
FIG. 3 conceptually shows operations of a regenerative carbon dioxide gas separator according to the present invention in relation to FIG. 2.

FIG. 3 conceptually shows operations of a regenerative carbon dioxide gas separator according to the present invention in relation to this embodiment.

When $Li_2ZrO_3$ is used as the absorbing/separating agent, the volume of carbon dioxide contained in the absorbing/separating agent reaches the maximum level at the temperature of about 600° C. If this temperature is determined as the "inflection point", the volume of carbon dioxide is reduced in both the temperature ranges higher and lower the inflection point. For example, when an effluent gas containing carbon dioxide gas contacts the absorbing/separating agent cooled to be at 500° C., the reaction for absorbing the carbon dioxide gas expressed by the above formula (1) starts, emitting heat of reaction. If contacting more carbon dioxide gas, the absorbing/separating agent keeps absorbing carbon dioxide gas and is heated by the heat energy until the temperature thereof reaches the inflection point, i.e., 600° C.

At the inflection point, the volume of carbon dioxide contained in the absorbing/separating agent is at the maximum level, thereby stopping the absorbing reaction. If the absorbing/separating agent is further heated, it starts releasing carbon dioxide gas while absorbing the heat energy as heat of reaction, as expressed in the above formula (2). The releasing of carbon dioxide gas continues until the temperature of the absorbing/separating agent reaches about 700 ° C., at which the volume of carbon dioxide contained in the absorbing/separating agent reaches the minimum level.

Figure 4:
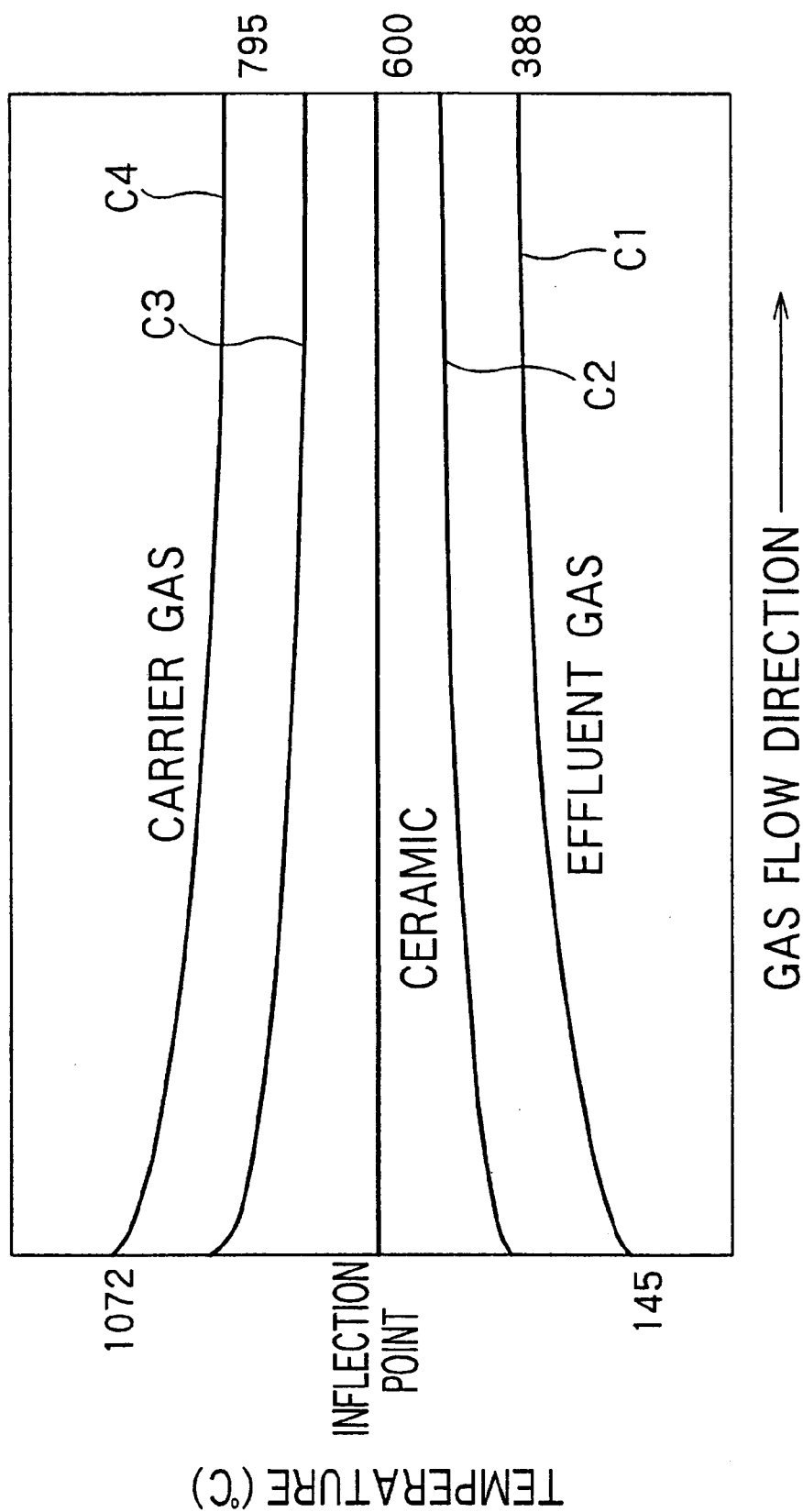
FIG. 4 is a graph showing an example of internal temperature distribution of a gas flow in a regenerative carbon dioxide gas separator according to the present invention.

FIG. 4 is a graph showing an example of internal temperature distribution of a gas flow in a regenerative carbon dioxide gas separator according to the present invention. For example, when the effluent gas G1 at the temperature of 145° C. is introduced into the separator at the low temperature section $1L$, the absorbing/separating agent $1g$ absorbs carbon dioxide gas, thereby raising the temperature thereof by heat of reaction, as shown by a curved line C1. Around an outlet of the separator, the temperature of the effluent gas G2 is about 388° C. As shown by a curved line C2 in FIG. 4, the temperature distribution of an effluent gas in the temperature range of higher than 145° C. and lower than the inflection point is between the curved line C1 and the inflection point.

On the other hand, when a carrier gas A1 at the temperature of 1072° C. is introduced into the separator at the high temperature section $1h$, the absorbing/separating agent releases carbon dioxide gas by absorbing the heat energy as heat of reaction, thereby lowering the temperature thereof, as shown by a curved line C4 in FIG. 4. Around the outlet of the separator, the temperature of the carrier gas A2 is about 795° C. In addition, as shown by a curved line C3 in FIG. 4, the temperature distribution of a carrier gas in the temperature range of lower than 1072° C. and higher than the inflection point is between the curved line C4 and the inflection point.

As is understood from the formula (1), 1 mol of solid absorbing/separating agent can absorb 1 mol of carbon dioxide gas. Calculated in volume, the absorbing/separating agent can absorb 400 times its own volume of carbon dioxide gas. If an absorbing liquid including an amine, mentioned in the descriptions of the conventional techniques, is used, the volume of carbon dioxide the absorbing liquid can absorb is about 20 times the volume of the absorbing liquid. Thus, by using an alkali metal oxide etc. as the absorbing/separating agent, it is possible to absorb more than 10 times of carbon dioxide than the conventional absorbing liquid. Therefore, it is possible to obtain a recovery system which is far small in volume but is highly efficient.

Besides $Li_2ZrO_3$ and $Li_4ZrO_4$, e.g., $Li_2O$ or $Na_2O$ can be used as an alkali metal oxide of the absorbing/separating agent of the present invention. The following absorbing/releasing reactions occur between $Li_2O$ and carbon dioxide gas:

$$Li_2O(s)+CO_2(g) \rightarrow Li_2CO_3(l) \qquad (3)$$

$$Li_2CO_3(l) \rightarrow Li_2O(s)+CO_2(g) \qquad (4)$$

The absorbing reaction (3) is remarkable in a temperature range of about 700° C. to about 1000° C. The releasing reaction (4) is remarkable in a temperature range of about 1100° C. or more. Therefore, if the absorbing/separating agent 1g is placed in the low temperature section in a temperature range of about 700° C. to about 1000° C., the absorbing/separating agent 1g actively absorbs carbon dioxide gas in the effluent gas. If the absorbing/separating agent is moved to the high temperature section in a temperature range of 1100° C. or more, the absorbed carbon dioxide is released.

In the case of using $Na_2O$, the absorbing reaction (3) is remarkable in a temperature range of about 700° C. to about 1700° C. The releasing reaction (4) is remarkable in a temperature range of about 1800° C. or more.

As an alkali earth metal oxide, which is the other material of the absorbing/separating agent, for example, MgO or CaO can be used. In the case of using MgO, the absorbing reaction is remarkable in a temperature range of about 300° C. to about 400° C. The releasing reaction is remarkable in a temperature range of about 800° C. or more.

By properly using the above-described materials as the absorbing/separating agent, it is possible to use a rotating regenerative carbon dioxide gas separator according to the present invention to process effluent gasses in various temperature ranges.

That is, when an effluent gas at a high temperature is processed, it is desirable that an absorbing/separating agent having a high inflection point is used. When an effluent gas at a low temperature is processed, it is desirable that an absorbing/separating agent having a low inflection point is used.

Moreover, it is possible to expand the processing temperature range by properly using two or more materials as absorbing/separating agents, thereby improving absorbing efficiency. Specifically, a separator according to the present invention has an internal temperature distribution along a gas flow, as shown in FIG. 4. Therefore, if, in each temperature range, a material that can absorb carbon dioxide gas most effectively in that temperature range is provided, it is possible to further improve the absorbing efficiency.

In the case of the temperature distributions shown in FIG. 4, some absorbing/separating agents may be deposited so that the inflection point varies in accordance with the temperature distribution of the effluent gas.

As understood from the above formula (1), the absorbing/separating agent 1g containing solid $Li_2ZrO_3$ absorbs carbon dioxide gas to generate solid $ZrO_2$ and liquid $Li_2CO_3$. Generally, it is preferable that an absorbing/separating agent such as lithium zirconate obtained as fine particles with the average particle diameter of 0.01 $\mu$m to a few $\mu$m is shaped to be grains or a porous article.

In the case of an absorbing/separating agent in the shape of grains, it is possible to have solid $ZrO_2$ as cores, and attach liquid $Li_2CO_3$ around the cores.

In the case of an absorbing/separating agent in the shape of a porous article, it is possible to have solid $ZrO_2$ as a skeleton, and attach liquid $Li_2CO_3$ around the skeleton.

Both of the above states are chemically and mechanically stable, and can absorb and release carbon dioxide gas stably and reversibly.

Further, it is possible to make "molded articles" of such a power, granular, or porous absorbing/separating agent by processing it into an aggregated, tubular, deformed-plane, or linear shape. Moreover, it is possible to make a molded article in an aggregated or plane-structured shape having through holes in a direction of a gas flow, like honeycomb-shape or briquette-shape.

It is also possible to make a supporting article obtained by shaping a ceramic material or metal into one of the above-described shapes supports an absorbing/separating agent on its surfaces. That is, it is possible that an absorbing/separating agent is supported on the surfaces of a molded article made of a ceramic material or metal in a granular, porous, aggregated, tubular, deformed-plane, or linear shape by means of applying, adhering, sticking, or coating. For example, it is possible to apply an absorbing/separating agent to a porous (particulate) material such as zeolite. Alternatively, it is possible that an absorbing/separating agent is supported on the surfaces of a molded article made of a ceramic material or metal, formed in an aggregated or plane-structured shape having through holes in a direction of gas flow, such as a honeycomb or briquette.

It is preferable that such a molded article or supporting article is formed in a shape to increase the contact area with gases, and to improve filling efficiency.

It is possible to further improve gas-contact efficiency of a granular, porous, aggregated, or deformed-plane molded article or supporting article by providing openings or projections on the surfaces thereof.

Molded articles or supporting articles in an aggregated shape having openings in a direction of gas flow may be referred to as various kinds of element blocks having circular, square, triangular, honeycomb, and star-shaped sections. For example, Japanese Patent No. 2879599 discloses the above-described shapes.

Molded articles or supporting articles in a plane-structured shape having through holes in a direction of gas flow may be called as articles made by combining a plurality of flat sheets and wave-shape sheets and positioning them in parallel to a direction of gas flow, or a various kinds of element plates having wave-shaped sections. For example, Japanese Patent No. 2660577, Japanese Patent Laid-Open Pub. Nos. 280761/1997 and 316608/1997, and Japanese Design Publication Nos. 721191 (K6-592) and 721191 similar 1 (K6-592 A similar) disclose such plane-structured shapes.

The specific terms used by those skilled in the art to call "tubular", "deformed-plane", "linear", "aggregated or plane-structured shape having through holes in a direction of gas flow" articles are as follows:

"Rasching ring", "Tellerette", "Pore ring", "Interlock saddle", "Berl saddle", "Lessing ring", "Partition ring", "Single spiral", "Double spiral", "Triple spiral", "Inter pack", "Helix packing", "Dixon packing", "McMahon packing", "Canon packing", "Stedmann packing", "Goodlow packing", "Spray pack", "Pana pack", "Wooden lattice", etc. The specific shapes of the above-mentioned articles are shown in, e.g., "Kagaku Kojo" (Chemical Factory), Vol. 12, No. 9 (1968)—Vol. 14, No. 7 (1970) or Vol. 15, No. 7 (1971).

The outer dimensions of such molded or supporting articles are, e.g., in a range of a few centimeters to a few tens of centimeters. Since the outer dimensions of the rotor 1b of the carbon dioxide gas separator shown in FIG. 1 are in a range of more than a few meters, a number of molded articles or supporting articles are loaded in the baskets of the compartments 1c.

Moreover, since the height of the rotor 1b is more than a few meters, having a plurality of baskets in a direction of gas flow, as shown in FIG. 1, may facilitate loading and replacing absorbing/separating agent. If net-like or lattice-like partitions are provided to each basket, the baskets can hold the absorbing/separating agent in a secured manner. Alternatively, a single basket may be provided along a direction of gas flow, and inside of the basket may be divided by lattice-like elements along the gas flow to load the absorbing/separating agent.

In addition, it is possible to move molded or supporting articles in a granular, porous, aggregated, tubular, deformed-plane, or linear shape in the baskets ba in accordance with the gas flow. This concept is similar to that of, e.g., "rotary type fluidized bed heat exchanger" disclosed in Japanese Patent Laid-Open Pub. No. 123989/1980. This structure helps further improve gas contact efficiency.

Further, molded or supporting articles in an aggregated or plane-structured shape having through holes in a gas flow, with a length identical with the depth (gas-flow direction) of a basket may be arranged in the basket. Alternatively, molded or supporting articles with a length shorter than the depth of the basket may be arranged in a few layers.

Moreover, molded or supporting articles having different sections or shapes may be combined to be loaded in the compartments. For example, a granular article and an aggregated article may be combined, or a linear article and a plane-structured article may be combined to be loaded in the compartments.

In addition, an absorbing/separating agent may be formed as an enamel element supplied by ABB ALSTOM Power K.K. The term "enamel element" represents elements obtained by laminating enameled wave-shape steel sheets. The structures of such elements are disclosed in, e.g., Japanese Patent No. 2660577, Japanese Patent Laid-Open Pub. Nos. 280761/1997 and 316608/1997, Japanese Design Publication Nos. 721191 (K6-592) and 721191 similar 1 (K6-592 A similar).

In the present invention, it is possible to realize a stable absorbing/separating reaction with extremely high gas contact efficiency, by applying an enamel, or applying an absorbing/separating agent such as lithium zirconate to surfaces of corrugated sheets by various ways such as coating, adhesion, welding, etc.

Especially, enamel elements supplied from ABB ALSTOM Power K.K. are advantageous since they cause little pressure loss, stand a mass volume of air flow, and achieve high contact efficiency with effluent gasses.

Next, a fixed type carbon dioxide gas separator will be described as a modified example of a regenerative carbon dioxide gas separator according to the present invention.

Figure 5:
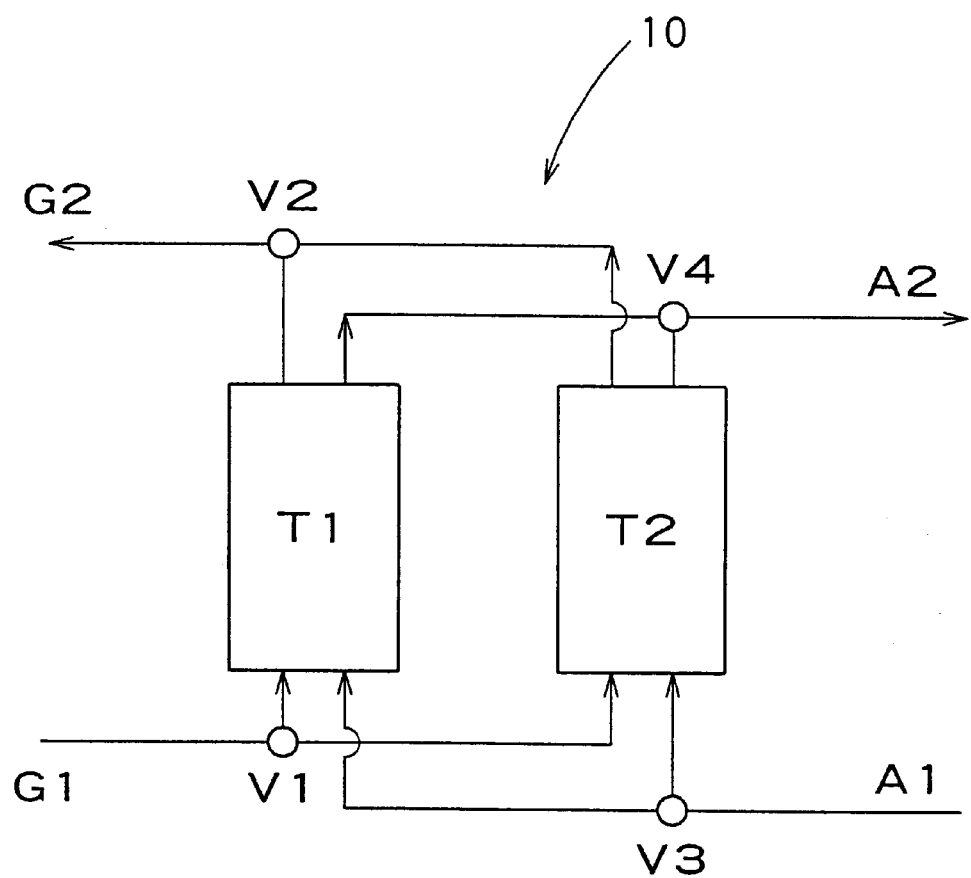
FIG. 5 conceptually shows the structure of the main part of a fixed regenerative carbon dioxide gas separator according to the present invention.

FIG. 5 conceptually shows the structure of the main part of a fixed regenerative carbon dioxide gas separator according to the present invention. A carbon dioxide separator 10 includes two reaction towers T1 and T2, ducts provided for the communication of the reaction towers, to connect inlet ports and outlet ports of first and second gasses, and selector valves V1–V4 for shielding and passing the first and second gasses. The reaction towers T1 and T2 are filled with an absorbing/separating agent 1g previously mentioned with reference to FIGS. 1 to 4.

An effluent gas G1 is supplied via the selector valve V1 to the reaction tower T1, whose temperature is maintained lower than the inflection point of the absorbing/separating agent. In this absorbing cycle, carbon dioxide gas contained in the effluent gas G1 is absorbed by the absorbing/separating agent and separated from the effluent gas G1 while the effluent gas G1 passes through the reaction tower T1. After the separation of carbon dioxide gas, the rest of the gas, i.e., an effluent gas G2 is removed via the selector valve V2 from the outlet of the reaction tower T1.

Next, the selector valves V1 to V4 are switched to achieve a regenerating cycle in which a high temperature carrier gas A1 is supplied to the reaction tower T1 instead of the effluent gas G1. Then, the carbon dioxide absorbed by the absorbing/separating agent is released, and discharged as a gas flow A2 containing the carbon dioxide gas and the carrier gas. At the same time, the reaction tower T2 is supplied with the effluent gas G1 to continue absorption/separation of carbon dioxide gas.

Thus, in this embodiment, it is possible to achieve continuous absorption/separation of carbon dioxide gas by processing an effluent gas until the absorption/separation reaction is saturated (completed) in a reaction tower, and then selecting another reaction tower by switching the gas flow by the use of selector valves.

That is, it is possible to carry out continuous effluent gas processing by performing absorbing cycles and regenerating cycles in a chained manner in each reaction tower.

According to this embodiment, no mechanically moving part is necessary in each reaction tower. Absorbing and regenerating operations are continuously carried out by properly operating the selector valves.

In FIG. 5, carbon dioxide is absorbed and separated by heating the absorbing/separating agent by the use of the high-temperature carrier gas A1. However, the present invention is not limited to this embodiment. For example, heating means, such as an electric heater, may be appropriately provided in each reaction tower as additional heating means to heat the absorbing/separating agent to a temperature higher than the inflection point.

Further, the structure of ducts is not limited to the drawn one. Different processing paths may be created by appropriately providing selector valves.

Moreover, the number of the reaction towers is not limited to two. Three or more of reaction towers may be combined to constitute a regenerative carbon dioxide gas separator. For example, the number of reaction towers may be appropriately determined in accordance with the pressure loss value of the separator, or the amounts of the effluent gas and the carrier gas.

In addition, a third reaction tower may be operated to purge the effluent gas G1 remaining in the ducts and the reaction towers at the time of switching the first and second reaction towers. In this way, unprocessed effluent gas G1 remaining in the ducts and the reaction towers is not discharged or mixed with the carrier gas.

Next, an effluent gas purifying system using a regenerative carbon dioxide gas separator according to the present invention will be described.

Figure 6:
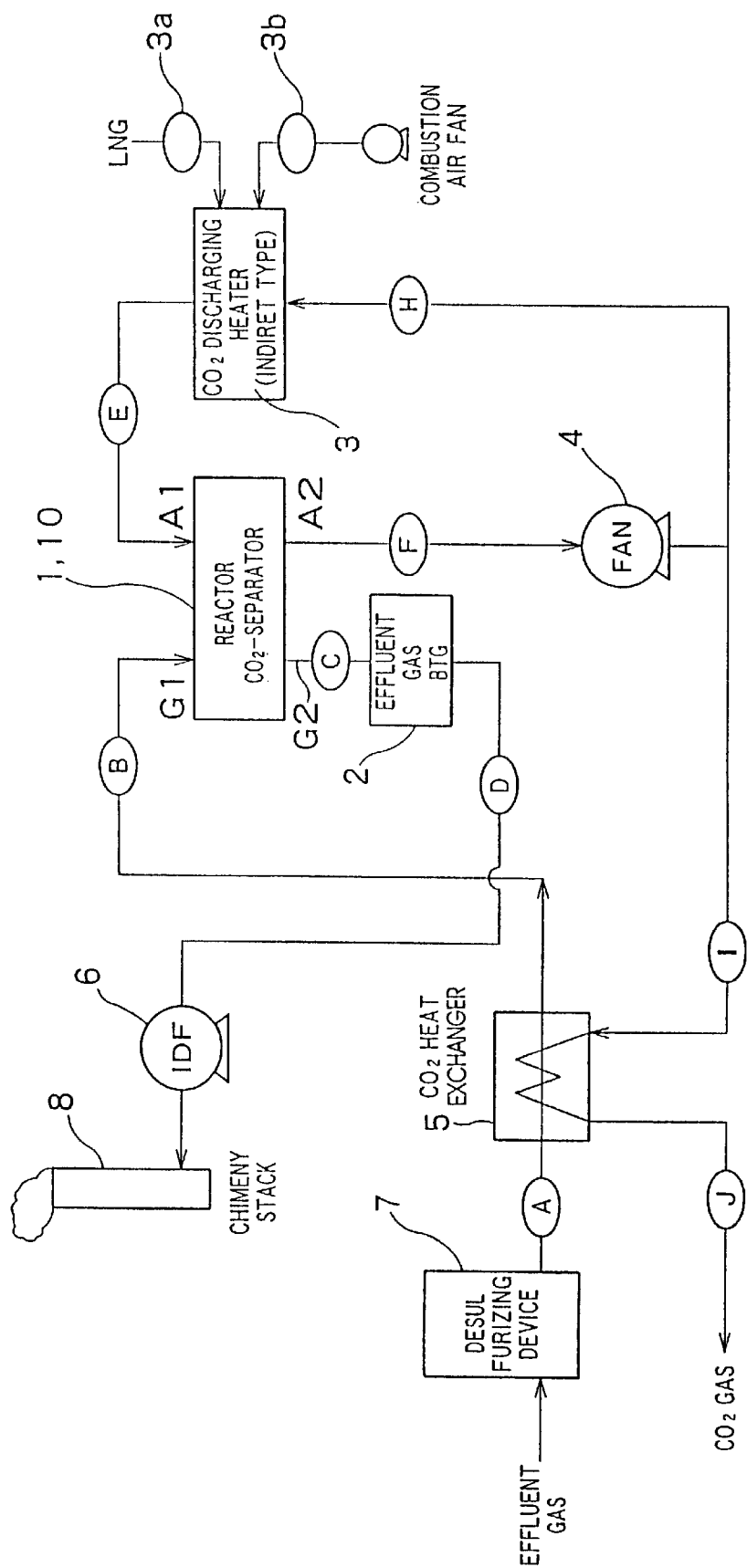
FIG. 6 conceptually shows the structure of an effluent gas purifying system using a rotating regenerative carbon dioxide gas separator according to the present invention.

FIG. 6 conceptually shows the structure of an effluent gas purifying system using a rotating regenerative carbon dioxide gas separator according to the present invention.

Table 1 shows data, such as kinds of gasses, flow volume, $CO_2$ volume, temperature, specific heat, and enthalpy of gas flows measured in the gas flow paths of the system employing the rotating regenerative carbon dioxide gas separator shown in FIG. 1.

TABLE 1

| Fluid Measuring Unit/Pos | Type of Fluid | Flow Volume KNm³/Hr | Co₂ Volume % | Temperature °C. | Specific Heat KCal/Nm3° C. | Enthalpy Mcal/Hr |
|---|---|---|---|---|---|---|
| A | Effluent gas | 3,000 | 13.5 | 100 | 0.25 | 279,750 |
| B | Effluent gas | 3,000 | 13.5 | 134 | 0.25 | 305,288 |
| C | Effluent gas | 2,798 | 6.75 | 557 | 0.25 | 580,248 |
| D | Effluent gas | 2,798 | 6.75 | 100 | 0.25 | 260,867 |
| E | CO₂ | 2,633 | 100 | 1078 | 0.25 | 889,290 |
| F | CO₂ | 2,798 | 100 | 631 | 0.25 | 632,260 |
| H | CO₂ | 2,633 | 100 | 631 | 0.25 | 594,969 |
| I | CO₂ | 203 | 100 | 631 | 0.25 | 45,765 |
| J | CO₂ | 203 | 100 | 127 | 0.25 | 20,227 |

In the system shown in FIG. 6, sulfur content is removed from an effluent gas G1 discharged from a boiler or incinerator (not shown) for burning a petroleum fuel, a coal fuel, an LNG gas, etc., at a desulfurizing device 7. Then, the effluent gas G1 is introduced via a passage A into a $CO_2$ heat exchanger 5 to be heated to a predetermined temperature. Next, the effluent gas G1 is introduced via a passage B into a carbon dioxide gas separator 1, 10 of the present invention to separate carbon dioxide gas. The rest of the effluent gas G1, i.e., an effluent gas G2, is sent via a passage C to a heat recovery system 2 to be cooled. In the heat recovery system 2, for example, steam is generated by the use of the heat of the effluent gas, and a steam turbine is rotated by the steam to generate electric power, thereby recovering heat energy. On the other hand, the effluent gas G2 cooled at the heat recovery system 2 is drawn by an induction fan 6, and ultimately discharged to the atmosphere from a chimney 8.

In the carbon dioxide gas separator 1, 10, mass transfer to remove carbon dioxide gas from the effluent gas G1 and to mix the carbon dioxide gas with a carrier gas A1 is carried out. A carrier gas A2 discharged from the carbon dioxide gas separator 1, 10 is delivered via a passage F to a fan 4. A part of the carrier gas A2 containing carbon dioxide gas, sent from the fan 4, is circulated to reach the carbon dioxide gas separator 1, 10 via a passage H, a heating device 3, and a passage E, thereby maintaining the temperature of a high-temperature section 1h of the carbon dioxide gas separator 1, 10 or a reaction tower of the regenerating cycle. The heating device 3 may be a regenerative burner for burning a mixture of LNG (3a) and combustion air (3b) or an indirect type furnace. The carrier gas containing carbon dioxide gas may be re-circulated through the passages E, F and H during a few rotations of the rotor 1b.

The carrier gas sent to a passage I from the fan 4 is introduced into a heat exchanger 5 to perform heat exchange with the effluent gas G1 before undergoing the previously described process. The heat exchanger 5 is preferably an indirect type furnace of a regenerative furnace to prevent the mixing of a carrier gas (carbon dioxide gas) into the effluent gas. The carrier gas (carbon dioxide gas) cooled by the heat exchanger 5 is recovered through a passage J.

The carbon dioxide gas thus obtained is reused or reprocessed in various ways, e.g., by being supplied to farm products in plastic houses, or by being secondarily used to synthesize methanol through a reaction with hydrogen.

As the heat exchanger 5, a "plate-type", "tubular-type", or "rotating regenerative-type" of heat exchanger may be used with which there is no fear of mixing heat exchanging media. A plate type of heat exchanger includes a laminated structure of heat exchange plates. A tubular type of heat exchanger includes a group structure of heat exchange tubes. High-temperature gas passages and low-temperature gas passages are provided in these laminated structure and group structure. Heat of a high-temperature gas is transferred from a passage wall via the heat exchange plates or the heat exchange tubes to a low temperature gas, thereby achieving heat exchange.

A rotating regenerative type of heat exchanger includes heat storage elements provided in a rotating rotor. In a high-temperature gas flow, the heat storage elements absorb heat, and in a low temperature gas flow, the heat storage elements emit heat, thereby achieving heat exchange. A typical example of such a rotating regenerative type of heat exchanger is supplied from ABB ALSTOM Power K.K. under the trade name of "Ljungstrom Heat Exchanger".

As mentioned previously, by using a regenerative carbon dioxide gas separator according to the present invention, it is possible to recover carbon dioxide gas in a highly efficient manner with a far simpler structure than that of conventional systems. According to the present invention, absorption and release of carbon dioxide gas can be carried out only by supplying and receiving energy obtained by heating and cooling. By combining the present invention and a heat recovery system, it is possible to accomplish an economical system in which the loss of energy is at a minimum level.

Specifically, if the rotating regenerative separator shown in FIG. 1 is employed in the system shown in FIG. 6, the costs required for recovering 1 ton of carbon dioxide gas is about 1,500 yen. This corresponds to about 0.6 yen per 1 kW of electric power generated by an electric power plant.

For the comparison purpose, the cost required by conventional separating methods will be described. In a chemical absorption method, the cost to generate electric power is about 1.8 yen. In a physical separation method, the cost is about 4.0 yen. Thus, in the present invention, the cost of separating carbon dioxide gas is less than one sixth of that of a conventional physical separation method, and about one third of a conventional chemical absorption method.

The preferred embodiments of the present invention have been described by referring to some specific examples. However, the present invention is not limited to these specific examples. For example, the absorbing/separating agent is not limited to lithium zirconate, but any material that reversibly absorbs and releases carbon dioxide gas depending on temperatures may be used to produce similar effects. Further, it is obvious that the processing temperature may be adjusted in accordance with materials to be used, or that the material of the absorbing/separating agent may be appropriately selected in accordance with the temperature of an effluent gas to be processed.

Moreover, the carbon dioxide gas separating system shown in FIG. 6 is also described as an example. Those skilled in the art may use various kinds of gas flow passages, heating means, and heat recovering means. For example, the second gas flow passage may not be circulated. In this case, as means for heating the second gas flow, a heat storage burner or an indirect type of furnace, which has similar effect to that of the previously mentioned circulating system, may be used.

In addition, the present invention is not limited to process an effluent gas discharged from a combustion boiler for burning a fuel. The present invention has the same effects on a various kinds of furnaces such as an incinerator, a chemical plant, etc., which emits carbon dioxide gas.

The present invention is carried out in a manner previously mentioned, and has the following advantages.

According to the present invention, a high-temperature section and a low-temperature section are provided on the circumference of a rotor. Therefore, it is possible to absorb and separate carbon dioxide gas contained in an effluent gas simply by rotating the rotor. Accordingly, it is possible to obtain a absorbing and separating system which is highly simplified but reliable. The regeneration costs of such a system can be remarkably reduced, and the maintenance of such a system is easy. A fixed type of carbon dioxide gas separator according to the present invention has similar advantages.

In addition, the present invention uses an alkali metal oxide such as lithium zirconate or an alkali earth metal oxide as an absorbing/separating agent. Therefore, the present invention is chemically and mechanically stable to reversibly absorb/release carbon dioxide gas.

Further, an absorbing/separating agent may be shaped into a "molded article" in a granular, porous, aggregated, tubular, deformed plane, or linear shape, or an aggregated or plane-structured article having through holes in a direction of a gas flow. Moreover, an absorbing/separating agent may be supported on a "supporting article" in a granular, porous, aggregated, tubular, deformed-plane, or linear shape, or an aggregated or plane-structured article having through holes in a direction of a gas flow. Such articles are advantageous in that they have wider contact area with effluent gasses, thereby accelerating the absorbing speed. Specifically, the above-described articles can absorb and separate more than ten times of carbon dioxide gas as compared with conventional cases. Therefore, with the above-described articles, it is possible to obtain a recovery system which is far compact in size but can achieve higher efficiency as compared with conventional cases.

On the other hand, a regenerative carbon dioxide gas separating system according to the present invention can realize extremely highly efficient recovery of carbon dioxide gas with a far simpler structure as compared with conventional cases. That is, in the present invention, the absorption and release of carbon dioxide gas can be carried out only by giving and receiving energy performed by heating and cooling. Therefore, with a heat recovery system, a regenerative carbon dioxide gas separating system according to the present invention can constitute an economical system in which loss of energy is minimized.

As described in detail, the present invention would bring great benefits to the related industries in that the initial investment costs and the maintenance costs thereof are low, that carbon dioxide gas can be highly efficiently recovered, and that the warming of the Earth' temperature can be efficiently suppressed without restricting industrial activities.

What is claimed is:

1. A carbon dioxide gas separating system comprising:
   a regenerative carbon dioxide gas separator including:
      a rotatable rotor;
      an absorbing/separating agent housed in said rotor, for absorbing carbon dioxide gas at a temperature lower than a predetermined temperature, and for releasing the absorbed carbon dioxide gas at a temperature higher than the predetermined temperature;
      a first gas flow passage for passing a first gas through said rotor in a direction substantially parallel to a central axis of rotation of said rotor;
      a second gas flow passage for passing a second gas through said rotor in a direction substantially parallel to the central axis of rotation of said rotor; and
      a sealing mechanism for preventing the mixing of said first gas and said second gas,
      wherein carbon dioxide gas contained in said first gas is absorbed by said absorbing/separating agent and the carbon dioxide gas absorbed by said absorbing/separating agent is released into said second gas by rotating said rotor while the temperature of said first gas flow passage is set to be lower than said predetermined temperature and the temperature of said second gas flow passage is set to be higher than said predetermined temperature;
   heating means for heating said second gas flow passage of said regenerative carbon dioxide gas separator to a temperature higher than said predetermined temperature;
   heat recovering means for cooling a gas flowing out of said first gas flow passage; and
   heat exchanging means for transferring heat energy from a gas containing carbon dioxide gas flowing out of said second gas flow passage to said first gas supplied to said first gas flow passage.

2. The carbon dioxide gas separating system according to claim 1 further comprising circulating means for re-supplying at least part of the gas containing carbon dioxide gas flowing out of said second gas flow passage to said second gas flow passage,
   wherein said heating means is a regenerative burner or an indirect type furnace for burning a fuel to heat the gas containing carbon dioxide gas circulated by said circulating means.

3. The carbon dioxide gas separating system according to claim 1, wherein said heat recovering means includes a boiler for generating steam by the use of the gas flowing out of said first gas flow passage.

4. The carbon dioxide gas separating system according to claim 1, wherein said heat recovering means includes a boiler for generating steam by the use of the gas flowing out of said first gas flow passage, a steam turbine driven by the steam generated by said boiler, and a generator driven by said steam turbine.

5. The carbon dioxide gas separating system according to claim 1, wherein said heat exchanging means is any of plate-type, tubular-type, or rotary-type of regenerative heat exchanger.

6. A carbon dioxide gas separating system comprising:
   a regenerative carbon dioxide gas separator comprising:
      a plurality of reaction chambers;
      an absorbing/separating agent housed in said plurality of reaction chambers, which absorbs carbon dioxide gas at a temperature lower than a predetermined temperature and releases the absorbed carbon dioxide gas at a temperature higher than the predetermined temperature; and switching means for selectively supplying one of first gas and second gas to said plurality of reaction chambers;

wherein the regenerative carbon dioxide gas separator sequentially performs in the reaction chambers:

absorption cycles in which said first gas is supplied to a reaction chamber to form a first gas flow passage while the temperature of the reaction chamber is maintained to be lower than the predetermined temperature, and said absorbing/separating agent absorbs carbon dioxide gas contained in said first gas; and regeneration cycles in which said second gas is supplied to the reaction chamber to form a second gas flow passage while the temperature of the reaction chamber is maintained to be higher than the predetermined temperature, and said absorbing/separating agent releases the absorbed carbon dioxide gas into the second gas;

heating means for heating said second gas flow passage of said regenerative carbon dioxide gas separator to a temperature higher than said predetermined temperature;

heat recovering means for cooling a gas flowing out of said first gas flow passage; and heat exchanging means for transferring heat energy from a gas containing carbon dioxide gas flowing out of said second gas flow passage to said first gas supplied to said first gas flow passage.

7. The carbon dioxide gas separating system according to claim 6 further comprising circulating means for re-supplying at least part of the gas containing carbon dioxide gas flowing out of said second gas flow passage to said second gas flow passage, wherein said heating means is a regenerative burner or an indirect type furnace for burning a fuel to heat the gas containing carbon dioxide gas circulated by said circulating means.

8. The carbon dioxide gas separating system according to claim 6, wherein said heat recovering means includes a boiler for generating steam by the use of the gas flowing out of said first gas flow passage.

9. The carbon dioxide gas separating system according to claim 6, wherein said heat recovering means includes a boiler for generating steam by the use of the gas flowing out of said first gas flow passage, a steam turbine driven by the steam generated by said boiler, and a generator driven by said steam turbine.

10. The carbon dioxide gas separating system according to claim 6, wherein said heat exchanging means is any of plate-type, tubular-type, or rotary-type of regenerative heat exchanger.

* * * * *